(12) United States Patent
Gi et al.

(10) Patent No.: US 10,396,628 B2
(45) Date of Patent: Aug. 27, 2019

(54) DRIVE DEVICE

(71) Applicant: AISIN AW CO., LTD., Anjo-shi, Aichi-ken (JP)

(72) Inventors: Meio Gi, Okazaki (JP); Katsutoshi Shimizu, Nukata (JP); Yasunori Oguri, Okazaki (JP); Kenji Sasaki, Anjo (JP); Katsunori Miyoshi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 270 days.

(21) Appl. No.: 15/129,591

(22) PCT Filed: Apr. 6, 2015

(86) PCT No.: PCT/JP2015/060756
§ 371 (c)(1),
(2) Date: Sep. 27, 2016

(87) PCT Pub. No.: WO2015/163130
PCT Pub. Date: Oct. 29, 2015

(65) Prior Publication Data
US 2017/0133912 A1 May 11, 2017

(30) Foreign Application Priority Data
Apr. 25, 2014 (JP) .................. 2014-091338

(51) Int. Cl.
*H02K 9/19* (2006.01)
*H02K 1/32* (2006.01)
*H02K 7/00* (2006.01)

(52) U.S. Cl.
CPC ............... *H02K 9/19* (2013.01); *H02K 1/32* (2013.01); *H02K 7/003* (2013.01)

(58) Field of Classification Search
CPC ............. H02K 9/19; H02K 7/003; H02K 1/32
USPC ......................................................... 310/54
See application file for complete search history.

(56) References Cited

U.S. PATENT DOCUMENTS

| | | | |
|---|---|---|---|
| 9,154,006 B2* | 10/2015 | Yamamoto | H02K 1/2766 |
| 2011/0001400 A1 | 1/2011 | Chiba et al. | |
| 2012/0299404 A1* | 11/2012 | Yamamoto | H02K 1/2766 310/61 |
| 2013/0305878 A1* | 11/2013 | Seno | F16H 57/0423 74/665 A |

(Continued)

FOREIGN PATENT DOCUMENTS

| | | |
|---|---|---|
| CN | 101803152 A | 8/2010 |
| EP | 0623988 A2 | 11/1994 |

(Continued)

OTHER PUBLICATIONS

Jun. 9, 2015 International Search Report issued in Patent Application No. PCT/JP2015/060756.

*Primary Examiner* — Forrest M Phillips
(74) *Attorney, Agent, or Firm* — Oliff PLC (57) ABSTRACT

A drive device that includes a cylindrical rotor core of a rotary electric machine, a rotor shaft that supports the rotor core from a radially inner side, and a power transfer shaft coupled such that the power transfer shaft rotates together with the rotor shaft, wherein: the rotor shaft is formed in a tubular shape that has an outer peripheral surface that contacts an inner peripheral surface of the rotor core; and the power transfer shaft is disposed radially inward of the rotor shaft.

16 Claims, 3 Drawing Sheets

(56) References Cited

U.S. PATENT DOCUMENTS

| | | | | |
|---|---|---|---|---|
| 2014/0265686 A1* | 9/2014 | Blaetner | ............... | F16C 35/067 |
| | | | | 310/90 |
| 2015/0042185 A1* | 2/2015 | Buttner | ................... | H02K 1/32 |
| | | | | 310/54 |
| 2015/0171702 A1* | 6/2015 | Matsuda | ................. | F16D 23/14 |
| | | | | 310/68 B |
| 2016/0023752 A1* | 1/2016 | Foskey | ................... | B64C 27/35 |
| | | | | 464/157 |

FOREIGN PATENT DOCUMENTS

| | | |
|---|---|---|
| JP | 2015-091198 A | 5/2015 |
| WO | 2011/118062 A1 | 9/2011 |

\* cited by examiner

DRIVE DEVICE

BACKGROUND

The present disclosure relates to a drive device that includes a cylindrical rotor core of a rotary electric machine, a rotor shaft that supports the rotor core from the radially inner side, and a power transfer shaft coupled such that the power transfer shaft rotates together with the rotor shaft.

A technology described in WO 2011/118062mentioned below, for example, is already known as the drive device described above. In the technology described in WO 2011/118062, cooling oil is supplied to the inner peripheral surface of a rotor shaft, which is formed in a cylindrical shape, to cool a rotor core.

SUMMARY

In the case where the inner peripheral surface of the rotor shaft is formed in a cylindrical shape as in the technology of WO 2011/118062, however, it is not easy to increase the surface area of the inner peripheral surface of the rotor shaft, and it is not easy to improve the efficiency of cooling the rotor core using the cooling oil.

In the case where the inner peripheral surface of the rotor shaft is formed in a cylindrical shape as in the technology of WO 2011/118062, in addition, the cooling oil flows freely along the cylindrical surface. Therefore, it is not easy to control the flow rate of the cooling oil such that heat transfer is improved, and it is not easy to suppress unevenness of the cooling oil in the circumferential direction. Therefore, it is not easy to improve the cooling efficiency.

In view of the foregoing, an exemplary aspect of the disclosure provides a drive device in which the inner peripheral surface of a rotor shaft can be cooled efficiently using cooling oil.

The present disclosure according to an exemplary aspect provides a drive device that includes a cylindrical rotor core of a rotary electric machine, a rotor shaft that supports the rotor core from a radially inner side, and a power transfer shaft coupled such that the power transfer shaft rotates together with the rotor shaft, in which: the rotor shaft is formed in a tubular shape that has an outer peripheral surface that contacts an inner peripheral surface of the rotor core; the power transfer shaft is disposed radially inward of the rotor shaft; outer engagement portions, which include a plurality of engagement grooves that extend in an axial direction in parallel with each other, are formed on at least a part of a region of an inner peripheral surface of the rotor shaft that overlaps the rotor core as seen in a radial direction; inner engagement portions, which include a plurality of engagement grooves that extend in the axial direction in parallel with each other and which are engageable with the outer engagement portions, are formed on an outer peripheral surface of the power transfer shaft; and the power transfer shaft is provided with a supply oil passage that supplies cooling oil to an axial oil passage, which includes clearances formed between the outer engagement portions and the inner engagement portions to extend in the axial direction.

The term "rotary electric machine" as used herein refers to any of a motor (electric motor), a generator (electric generator), and a motor generator that functions both as a motor and as a generator as necessary.

With the characteristic configuration described above, recesses and projections of the outer engagement portions can increase the surface area of the inner peripheral surface of the rotor shaft, compared to a case where no such recesses and projections are provided, which makes it possible to improve the heat transfer between the cooling oil and the rotor shaft, and to improve the cooling efficiency for the rotor core. In addition, the outer engagement portions are formed on a region that overlaps the rotor core as seen in the radial direction. Thus, it is possible to efficiently cool heat transferred from the rotor core to the rotor shaft.

In addition, diversion of the outer engagement portions, which are formed for engagement between the rotor shaft and the power transfer shaft, eliminates the need to form grooves just in order to increase the surface area of the inner peripheral surface of the rotor shaft.

Preferably, a circumferential oil passage is formed between the inner peripheral surface of the rotor shaft and the outer peripheral surface of the power transfer shaft, the circumferential oil passage being continuous in an entire region in a circumferential direction and communicating with the axial oil passage; and a downstream opening of the supply oil passage opens toward the circumferential oil passage.

With the configuration, the circumferential oil passage facilitates cooling oil, which has been supplied from the supply oil passage, flowing in the circumferential direction to be supplied to the clearances (the inner peripheral surface of the rotor shaft) between the outer engagement portions and the inner engagement portions evenly in the circumferential direction. In addition, the circumferential oil passage can suppress occurrence of uneven distribution of cooling oil in the circumferential direction even if the number or the area of the downstream opening of the supply oil passage is small.

Preferably, a cross-sectional area of the axial oil passage as viewed in the axial direction at a boundary between the circumferential oil passage and the axial oil passage is smaller than a cross-sectional area of the circumferential oil passage.

With the configuration, cooling oil, which has been supplied to the circumferential oil passage, can be caused to flow in the circumferential direction and be stored in the circumferential oil passage with the flow rate of the cooling oil reduced by the clearances between the outer engagement portions and the inner engagement portions when the cooling oil flows from the circumferential oil passage into the axial oil passage. Hence, the cooling oil can be supplied to the clearances between the outer engagement portions and the inner engagement portions evenly in the circumferential direction, which improves the cooling efficiency. In addition, the inner peripheral surface of the rotor shaft can be efficiently cooled, even at the position of the circumferential oil passage, by the cooling oil stored in the circumferential oil passage.

Preferably, the inner engagement portions are formed separately on both sides of the circumferential oil passage in the axial direction.

With the configuration, cooling oil can be caused to flow from the circumferential oil passage toward the clearances between the outer engagement portions and the inner engagement portions on both sides in the axial direction. This makes it possible to suppress occurrence of unevenness in cooling of the inner peripheral surface of the rotor shaft between both sides in the axial direction.

Preferably, the inner engagement portions are not formed, but a cylindrical surface portion that has a cylindrical surface is formed, on a region of the outer peripheral surface of the power transfer shaft that overlaps the circumferential oil passage as seen in the radial direction.

With the configuration, the inner engagement portions are not formed, whereby the circumferential oil passage can be formed, and a smooth flow of cooling oil in the circumferential direction can be achieved.

Preferably, the outer engagement portions are formed also on a region of the inner peripheral surface of the rotor shaft that overlaps the circumferential oil passage as seen in the radial direction.

With the configuration, the surface area of the inner peripheral surface of the rotor shaft can be increased by the outer engagement portions, even in a region in which the circumferential oil passage is formed, which makes it possible to improve the cooling efficiency.

Preferably, the rotor shaft further includes a coil end cooling oil passage configured to supply cooling oil to a coil end, which is a portion of a stator coil of the rotary electric machine that projects from an axial end of a stator core; the coil end cooling oil passage is formed to penetrate the rotor shaft in the radial direction; and the axial oil passage and the coil end cooling oil passage communicate with each other via a space between the inner peripheral surface of the rotor shaft and the outer peripheral surface of the power transfer shaft.

With the configuration, cooling oil that has flowed through the axial oil passage can be led to the coil end cooling oil passages via the space between the inner peripheral surface of the rotor shaft and the outer peripheral surface of the power transfer shaft. The cooling oil can then be led to the radially outer side of the rotor shaft via the coil end cooling oil passages. After that, the cooling oil can be supplied to the coil end, which are positioned on the radially outer side, by a centrifugal force due to rotation of the rotor shaft to cool the coil end portions.

Preferably, the power transfer shaft includes a first power transfer shaft and a second power transfer shaft that are separate members separated from each other in the axial direction; first inner engagement portions that form a part of the inner engagement portions are formed on an outer peripheral surface of the first power transfer shaft; second inner engagement portions that form another part of the inner engagement portions are formed on an outer peripheral surface of the second power transfer shaft; and the circumferential oil passage is formed between the first inner engagement portions and the second inner engagement portions in the axial direction.

With the configuration, the first power transfer shaft and the second power transfer shaft can be coupled so as to rotate together with each other via the rotor shaft, and the inner peripheral surface of the rotor shaft can be cooled efficiently as described above. In addition, the circumferential oil passage can be formed easily utilizing the construction in which the power transfer shaft is divided.

Preferably, distal ends of projecting portions of the inner engagement portions are formed in a linear shape in section, and bottom portions of recessed portions of the outer engagement portions are formed in an arcuate shape in section to project radially outward.

With the configuration, the clearances between the distal ends of the projecting portions of the inner engagement portions and the bottom portions of the recessed portions of the outer engagement portions are widened by an amount corresponding to the arcuate projection, which facilitates securing the cross-sectional area of the cooling oil passage. In addition, the linear shape can be formed easily by cutting off the distal end portions of the inner engagement portions, and a desired cross-sectional area of the flow path can be obtained by adjusting the amount to be cut off in accordance with the flow rate required for the axial oil passage.

DETAILED DESCRIPTION OF EMBODIMENTS

A drive device 1 according to an embodiment of the present disclosure will be described with reference to the drawings.

The drive device 1 includes a cylindrical rotor core Ro of a rotary electric machine MG, a rotor shaft 10 that supports the rotor core Ro from the radially inner side, and a power transfer shaft 20 coupled such that the power transfer shaft 20 rotates together with the rotor shaft 10.

Figure 1:
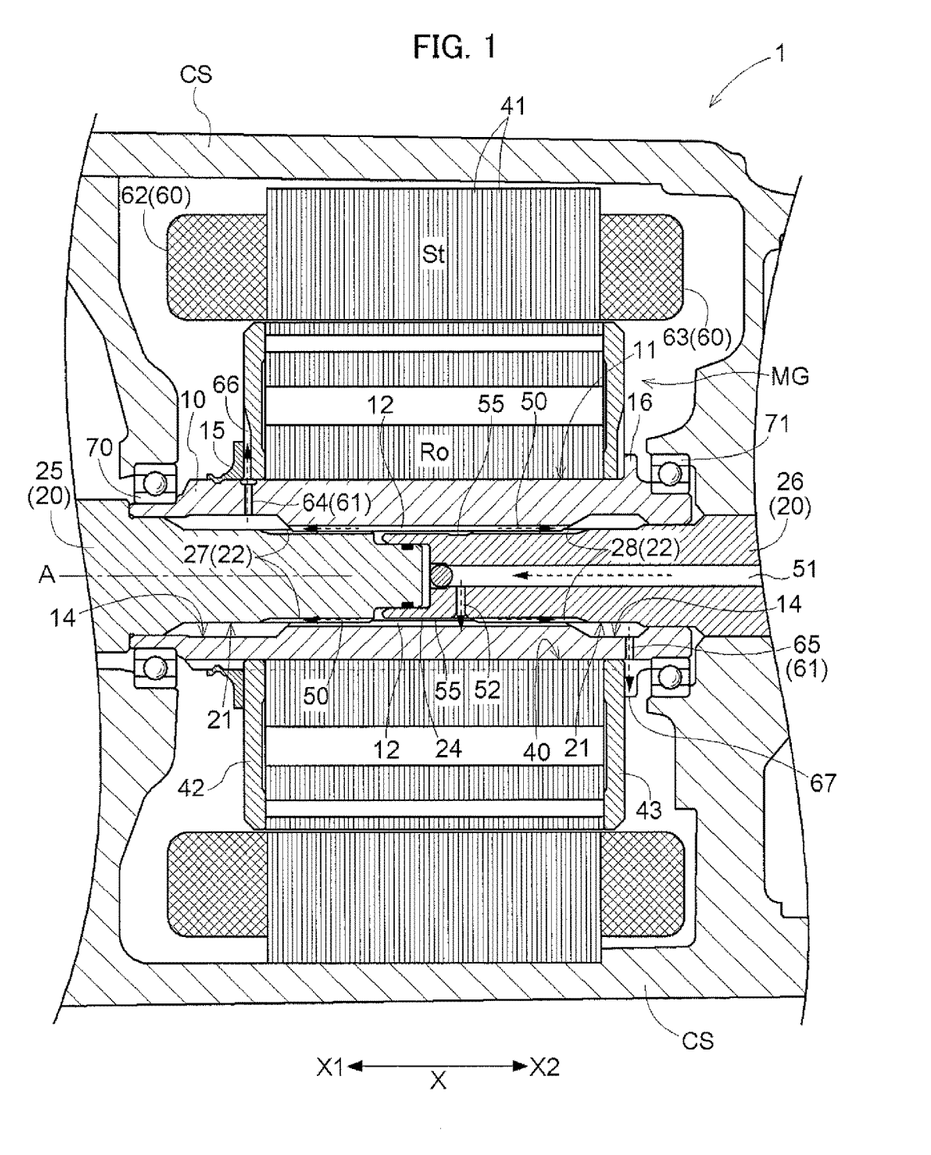
FIG. 1 is an axial sectional view of an essential portion of a drive device according to an embodiment of the present disclosure.
Figure 2:
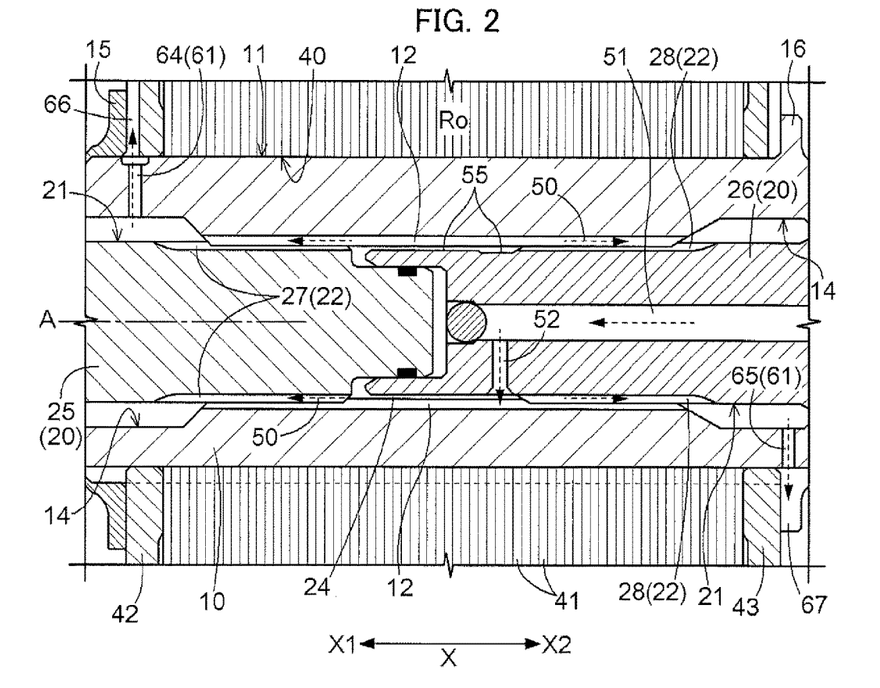
FIG. 2 is an axial sectional view of an essential portion of the drive device according to the embodiment of the present disclosure.
Figure 3:
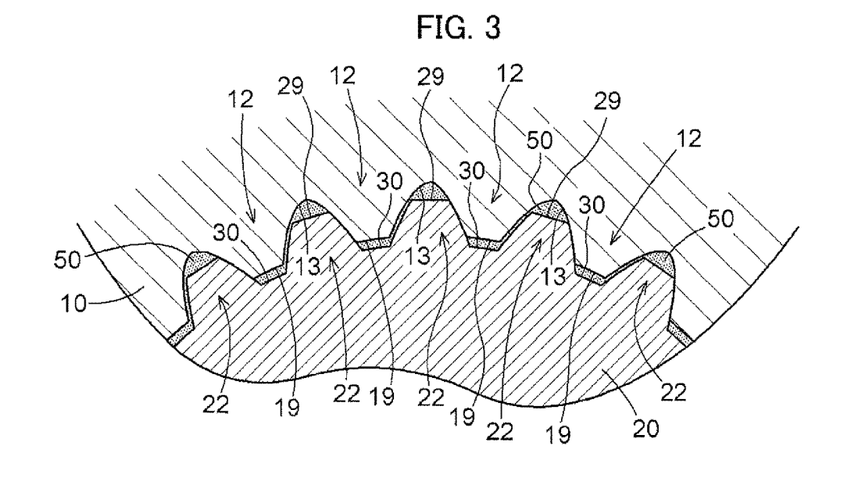
FIG. 3 is a sectional view of a portion related to an axial oil passage of the drive device according to the embodiment of the present disclosure, taken along a plane that is orthogonal to the axial direction.

FIGS. 1 and 2 are each an axial sectional view of an essential portion of the drive device 1, taken along a plane that includes an axis A of the rotary electric machine MG. FIG. 3 is a sectional view of a portion related to an axial oil passage 50 of the drive device 1, taken along a plane that is orthogonal to an axial direction X.

The rotor core Ro, the rotor shaft 10, and the power transfer shaft 20 are disposed coaxially with the axis A. One side in the axial direction X, which is parallel to the axis A, is defined as a first axial direction X1, and the other side in the axial direction X, which is opposite to the first axial direction X1, is defined as a second axial direction X2.

As illustrated in FIGS. 1 and 2, the rotor shaft 10 is formed in a tubular shape that has an outer peripheral surface 11 that contacts an inner peripheral surface 40 of the rotor core Ro. The power transfer shaft 20 is disposed radially inward of the rotor shaft 10.

Outer engagement portions 12, which include a plurality of engagement grooves that extend in the axial direction X in parallel with each other, are formed on at least a part of a region of an inner peripheral surface 14 of the rotor shaft 10 that overlaps the rotor core Ro as seen in the radial direction. Inner engagement portions 22, which include a plurality of engagement grooves that extend in the axial direction X in parallel with each other and which are engageable with the outer engagement portions 12, are formed on an outer peripheral surface 21 of the power transfer shaft 20.

The power transfer shaft 20 is provided with a supply oil passage 51 that supplies cooling oil to the axial oil passage 50, which includes clearances formed between the outer engagement portions 12 and the inner engagement portions 22 to extend in the axial direction X.

A detailed description will be made below.

1. Rotor Core Ro

As illustrated in FIGS. 1 and 2, the rotary electric machine MG includes a stator core St fixed to a case CS that serves as a non-rotary member, and the rotor core Ro which is disposed radially inward of the stator core St and which is supported such that the rotor core Ro is rotatable.

The rotor core Ro includes a plurality of magnetic steel sheets 41 in an annular plate shape stacked on each other along the axial direction X. The plurality of stacked magnetic steel sheets 41 are fixed to each other by dowel crimping, welding, bonding, or the like to be integrated as a whole. The rotor core Ro is formed in a cylindrical shape that has a through hole in the radially central portion thereof. The inner peripheral surface 40 of the rotor core Ro is fitted with the outer peripheral surface 11 of the rotor shaft 10 such that the rotor core Ro and the rotor shaft 10 rotate together.

In the embodiment, a first end plate 42 abuts against the first axial direction X1 side of the rotor core Ro, and a second end plate 43 abuts against the second axial direction X2 side of the rotor core Ro.

The end plates 42 and 43 are each a member in an annular plate shape that has the inside diameter and the outside diameter that are equivalent to those of the rotor core Ro. The inner peripheral surfaces of the end plates 42 and 43 are fitted with the outer peripheral surface 11 of the rotor shaft 10.

The rotor core Ro and the end plates 42 and 43 are held between a first flange portion 15 and a second flange portion 16, which are fixed to the rotor shaft 10, from both sides in the axial direction X to be positioned in the axial direction X with respect to the rotor shaft 10.

2. Rotor Shaft 10

The rotor shaft 10 supports the rotor core Ro from the radially inner side.

The rotor shaft 10 is formed in a tubular shape (in the example, a cylindrical shape) that has the outer peripheral surface 11 which contacts the inner peripheral surface 40 of the rotor core Ro.

In the embodiment, the second flange portion 16 is a member disposed on the second axial direction X2 side with respect to the rotor core Ro, and formed integrally with the rotor shaft 10 so as to project radially outward with respect to a surface of the rotor shaft 10 fitted with the rotor core Ro.

The first flange portion 15 is disposed on the first axial direction X1 side with respect to the rotor core Ro, fitted with the outer peripheral surface 11 of the rotor shaft 10, and fixed to the outer peripheral surface 11 of the rotor shaft 10 by crimping or the like.

An end portion of the rotor shaft 10 on the first axial direction X1 side is supported via a bearing 70 from the radially outer side so as to be rotatable with respect to the case CS. An end portion of the rotor shaft 10 on the second axial direction X2 side is supported via a bearing 71 from the radially outer side so as to be rotatable with respect to the case CS.

The outer engagement portions 12, which include a plurality of engagement grooves that extend in the axial direction X in parallel with each other, are formed on at least a part of a region of the inner peripheral surface 14 of the rotor shaft 10 that overlaps the rotor core Ro as seen in the radial direction. The outer engagement portions 12 are formed as engagement grooves, or so-called spline grooves, that extend in the axial direction X over the entire circumference.

3. Power Transfer Shaft 20

The power transfer shaft 20 is coupled so as to rotate together with the rotor shaft 10. The power transfer shaft 20 couples the rotary electric machine MG to another power transfer device or drive force source to transfer a drive force of the rotary electric machine MG to the other power transfer device or drive force source. In the case where the drive device 1 is a drive device for a vehicle, the other power transfer device may be a gear mechanism such as a speed change device, a counter gear mechanism, and a planetary gear mechanism or a wheel, and the other drive force source may be another rotary electric machine or an internal combustion engine. For example, the first axial direction X1 side of the power transfer shaft 20 is coupled to an internal combustion engine, and the second axial direction X2 side of the power transfer shaft 20 is coupled to a wheel via a speed change device or the like.

The power transfer shaft 20 is disposed radially inward of the rotor shaft 10.

In the embodiment, the power transfer shaft 20 is formed in a circular column shape, extends in the axial direction X in a space radially inward of the rotor shaft 10, and projects on the first axial direction X1 side and the second axial direction X2 side with respect to the rotor shaft 10.

The inner engagement portions 22, which include a plurality of engagement grooves that extend in the axial direction X in parallel with each other and which are engageable with the outer engagement portions 12, are formed on the outer peripheral surface 21 of the power transfer shaft 20. The inner engagement portions 22 are formed as engagement grooves, or so-called spline grooves, that extend in the axial direction X over the entire circumference.

In the embodiment, the power transfer shaft 20 is composed of a first power transfer shaft 25 and a second power transfer shaft 26 that are separate members separated from each other in the axial direction X. The first power transfer shaft 25 is the power transfer shaft 20 on the first axial direction X1 side which extends on the first axial direction X1 side from a position around the center of the rotor core Ro in the axial direction X. The second power transfer shaft 26 is the power transfer shaft 20 on the second axial direction X2 side which extends on the second axial direction X2 side from a position around the center of the rotor core Ro in the axial direction X.

First inner engagement portions 27 that constitute a part of the inner engagement portions 22 are formed on the outer peripheral surface of the first power transfer shaft 25. Second inner engagement portions 28 that constitute another part of the inner engagement portions 22 are formed on the outer peripheral surface of the second power transfer shaft 26.

Both the first inner engagement portions 27 and the second inner engagement portions 28 are fitted with the outer engagement portions 12 of the rotor shaft 10, so that the first power transfer shaft 25 and the second power transfer shaft 26 are coupled so as to rotate together with each other via the rotor shaft 10.

In the embodiment, the first power transfer shaft 25 and the second power transfer shaft 26 are fitted with each other at a position around the center of the rotor core Ro in the axial direction X. Specifically, an end portion of the second power transfer shaft 26 on the first axial direction X1 side is an opening portion that opens in the first axial direction X1 and is formed in a cylindrical shape. An end portion of the first power transfer shaft 25 on the second axial direction X2 side is formed as a small diameter portion that has a reduced diameter. The small diameter portion is inserted into the opening portion of the second power transfer shaft 26, so that the outer peripheral surface of the small diameter portion is fitted with the inner peripheral surface of the opening portion.

4. Cooling Oil Passage of Rotary Electric Machine MG

<Axial Oil Passage 50>

In order to cool the rotor core Ro etc., cooling oil is supplied to the inner peripheral surface 14 of the rotor shaft 10, which is contacted by the inner peripheral surface 40 of the rotor core Ro.

If the inner peripheral surface 14 of the rotor shaft 10 is formed in a cylindrical shape as in the related art, however, it is not easy to increase the surface area of the inner peripheral surface 14 of the rotor shaft 10, and it is not easy to improve the efficiency of cooling the rotor core Ro using the cooling oil.

Thus, in the embodiment, as described above, the outer engagement portions 12 are formed on the inner peripheral surface 14 of the rotor shaft 10, the inner engagement portions 22 are formed on the outer peripheral surface 21 of the power transfer shaft 20, and clearances that extend in the axial direction X are formed between the outer engagement portions 12 and the inner engagement portions 22, which are engaged with each other, to serve as the axial oil passage 50. The power transfer shaft 20 is provided with the supply oil passage 51 through which cooling oil is supplied to the axial oil passage 50. In the embodiment, the supply oil passage 51 is an oil passage that extends in the axial direction X in the power transfer shaft 20, and cooling oil is supplied to the supply oil passage 51 from a hydraulic pressure supply device.

As illustrated in FIG. 3, the outer engagement portions 12 and the inner engagement portions 22 are spline-fitted with each other, and clearances are provided between the engagement grooves of the outer engagement portions 12 and the engagement grooves of the inner engagement portions 22 to allow the outer engagement portions 12 and the inner engagement portions 22 to slide in the axial direction X to be fitted with each other etc. Such clearances serve as the axial oil passage 50 which extends in the axial direction X.

With the outer engagement portions 12 which are formed for spline-fitting, it is possible to increase the surface area of the inner peripheral surface 14 of the rotor shaft 10, to improve the heat transfer between the cooling oil and the rotor shaft 10, and to improve the cooling efficiency for the rotor core Ro. In addition, the outer engagement portions 12 are formed on a region that overlaps the rotor core Ro as seen in the radial direction. Thus, it is possible to efficiently cool heat transferred from the rotor core Ro to the rotor shaft 10. In the embodiment, the outer engagement portions 12 are formed on approximately 80%, which is equal to or more than 50%, of the region of the inner peripheral surface 14 of the rotor shaft 10 that overlaps the rotor core Ro as seen in the radial direction. This makes it possible to cool the rotor core Ro evenly over its entirety in the axial direction X.

In addition, cooling oil supplied from the supply oil passage 51 is reduced in flow rate by the clearances between the outer engagement portions 12 and the inner engagement portions 22. Thus, it is possible to improve the cooling efficiency by supplying the cooling oil to the clearances (the inner peripheral surface 14 of the rotor shaft 10) between the outer engagement portions 12 and the inner engagement portions 22 evenly in the circumferential direction.

In the case where the inner peripheral surface 14 of the rotor shaft 10 is a cylindrical surface as in the related art, the cooling oil flows relatively freely along the cylindrical surface. Therefore, it is not easy to control the flow rate of the cooling oil such that heat transfer is improved, it is not easy to suppress unevenness of the cooling oil in the circumferential direction, depending on the arrangement of a supply port for the cooling oil, and therefore it is not easy to improve the cooling efficiency.

In addition, diversion of the outer engagement portions 12, which are formed for engagement between the rotor shaft 10 and the power transfer shaft 20, eliminates the need to form grooves just in order to increase the surface area of the inner peripheral surface of the rotor shaft 10.

In FIG. 3, torque in one direction is transferred, and therefore each of the clearances on one side is formed to be larger than each of the clearances on the other side in the circumferential direction between the rotor shaft 10 and the power transfer shaft 20. This allows the size of each of the clearances between the outer engagement portions 12 and the inner engagement portions 22 to be reduced on one side in the circumferential direction, and to be increased on the other side in the circumferential direction, whereby the cooling oil passage is secured. This also improves the cooling efficiency with the effect of reducing the flow rate caused by the clearances described above, even if the surface area of the cooling oil passage is decreased to a degree.

In the embodiment, as illustrated in FIG. 3, distal end portions 29 of projecting portions of the inner engagement portions 22 are formed in a linear shape in section, and bottom portions 13 of recessed portions of the outer engagement portions 12 are formed in an arcuate shape in section to project radially outward. With the configuration, the clearances between the distal end portions 29 of the projecting portions of the inner engagement portions 22 and the bottom portions 13 of the recessed portions of the outer engagement portions 12 are widened by an amount corresponding to the arcuate projection, which facilitates securing the cross-sectional area of the cooling oil passage. In addition, the linear shape can be formed easily by cutting off the distal end portions 29 of the inner engagement portions 22, and a desired cross-sectional area of the flow path can be obtained by adjusting the amount to be cut off in accordance with the flow rate required for the axial oil passage 50.

In addition, bottom portions 30 of recessed portions of the inner engagement portions 22 are formed in a linear shape in section, distal end portions 19 (i.e., distal ends) of projecting portions of the outer engagement portions 12 are formed in a linear shape, and clearances are provided between the bottom portions 30 of the inner engagement portions 22 and the distal end portions 19 of the outer engagement portions 12 to also serve as a cooling oil passage.

<Circumferential Oil Passage 55>

As illustrated in FIGS. 1 and 2, a circumferential oil passage 55 is formed between the inner peripheral surface 14 of the rotor shaft 10 and the outer peripheral surface 21 of the power transfer shaft 20. The circumferential oil passage 55 is continuous over the entire region in the circumferential direction, and communicates with the axial oil passage 50. A downstream opening portion 52 (i.e., downstream opening) of the supply oil passage 51 opens toward the circumferential oil passage 55.

With the configuration, the circumferential oil passage 55 facilitates cooling oil, which has been supplied from the supply oil passage 51, flowing in the circumferential direction to be supplied to the clearances (the inner peripheral surface 14 of the rotor shaft 10) between the outer engagement portions 12 and the inner engagement portions 22 evenly in the circumferential direction. In addition, the circumferential oil passage 55 can suppress occurrence of uneven distribution of cooling oil in the circumferential direction even if the number or the area of the downstream opening portion 52 of the supply oil passage 51 is small. In the embodiment, the downstream opening portion 52 of the supply oil passage 51 is provided at only one location in the circumferential direction.

In the embodiment, the cross-sectional area of the axial oil passage 50 as viewed in the axial direction X at the boundary portion (i.e., boundary) between the circumferential oil passage 55 and the axial oil passage 50 is smaller than the cross-sectional area of the circumferential oil passage 55.

With the configuration, cooling oil, which has been supplied to the circumferential oil passage 55, can be caused to flow in the circumferential direction and be stored in the circumferential oil passage 55 with the flow rate of the cooling oil reduced by the clearances between the outer engagement portions 12 and the inner engagement portions 22 when the cooling oil flows from the circumferential oil passage 55 into the axial oil passage 50. Hence, the cooling oil can be supplied to the clearances between the outer engagement portions 12 and the inner engagement portions 22 evenly in the circumferential direction, which improves the cooling efficiency. In addition, the inner peripheral surface 14 of the rotor shaft 10 can be efficiently cooled, even at the position of the circumferential oil passage 55, by the cooling oil stored in the circumferential oil passage 55.

In the embodiment, the cross-sectional area of the circumferential oil passage 55 as viewed in the axial direction X is larger than the cross-sectional area of the axial oil passage 50 over the entire circumferential oil passage 55 in the axial direction X.

In the embodiment, the inner engagement portions 22 are not formed, but a cylindrical surface portion 24 that has a cylindrical surface is formed, on a region of the outer peripheral surface 21 of the power transfer shaft 20 that overlaps the circumferential oil passage 55 as seen in the radial direction. The inner engagement portions 22 are not formed, whereby the circumferential oil passage 55 can be formed, and a smooth flow of cooling oil in the circumferential direction can be achieved.

In the embodiment, a cylindrical recessed portion that is dented radially inward over the entire circumference is formed in the outer peripheral surface 21 of the power transfer shaft 20 at a position, in the axial direction X, at which the downstream opening portion 52 of the supply oil passage 51 is provided. Such a recessed portion increases the width of the circumferential oil passage 55 in the radial direction, and can smooth the flow of cooling oil, which has been supplied from the downstream opening portion 52, in the circumferential direction.

Meanwhile, the outer engagement portions 12 are formed on a region of the inner peripheral surface 14 of the rotor shaft 10 that overlaps the circumferential oil passage 55 as seen in the radial direction. With the configuration, the surface area of the inner peripheral surface 14 of the rotor shaft 10 can be increased by the outer engagement portions 12, even in a region in which the circumferential oil passage 55 is formed, which makes it possible to improve the cooling efficiency.

<Division of Inner Engagement Portions 22>

In the embodiment, the inner engagement portions 22 are formed separately on both sides of the circumferential oil passage 55 in the axial direction X.

With the configuration, cooling oil, which has been supplied to the circumferential oil passage 55, can be caused to flow in the circumferential direction and be stored in the circumferential oil passage 55 with the flow rate of the cooling oil reduced by the clearances between the outer engagement portions 12 and the inner engagement portions 22 on both sides of the circumferential oil passage 55 in the axial direction X. Hence, cooling oil can be supplied to the clearances between the outer engagement portions 12 and the inner engagement portions 22 on both sides in the axial direction X evenly in the circumferential direction.

In addition, the inner peripheral surface 14 of the rotor shaft 10 can be efficiently cooled, even at the position of the circumferential oil passage 55 which is disposed around the center of the rotor core Ro in the axial direction X, by the cooling oil stored in the circumferential oil passage 55. In the embodiment, in particular, the outer engagement portions 12 are also framed in a region in which the circumferential oil passage 55 is formed, and therefore the surface area of the inner peripheral surface 14 of the rotor shaft 10 can be increased by the outer engagement portions 12, which makes it possible to improve the cooling efficiency.

Cooling oil can be caused to flow from the circumferential oil passage 55 toward the clearances between the outer engagement portions 12 and the inner engagement portions 22 on both sides in the axial direction X. This makes it possible to suppress occurrence of unevenness in cooling of the inner peripheral surface 14 of the rotor shaft 10 between both sides in the axial direction X.

In the embodiment, as described above, the first inner engagement portions 27 which constitute a part of the inner engagement portions 22 are formed on the outer peripheral surface of the first power transfer shaft 25, and the second inner engagement portions 28 which constitute another part of the inner engagement portions 22 are formed on the outer peripheral surface of the second power transfer shaft 26, The circumferential oil passage 55 is formed between the first inner engagement portions 27 and the second inner engagement portions 28 in the axial direction X, With the configuration, the first power transfer shaft 25 and the second power transfer shaft 26 can be coupled so as to rotate together with each other via the rotor shaft 10, and the inner peripheral surface 14 of the rotor shaft 10 can be cooled efficiently as described above.

In the embodiment, the second power transfer shaft 26 extends toward the first axial direction X1 with respect to a portion on which the second inner engagement portions 28 are formed, and the circumferential oil passage 55 is formed between the outer peripheral surface 21 of the second power transfer shaft 26 and the inner peripheral surface 14 of the rotor shaft 10. In addition, the supply oil passage 51 is formed in the second power transfer shaft 26, and the downstream opening portion 52 opens on the first axial direction X1 side of the second inner engagement portions 28 in the outer peripheral surface of the second power transfer shaft 26.

<Coil End Cooling Oil Passage 61>

The stator core St is formed in a cylindrical shape by stacking the magnetic steel sheets along the axial direction X. A stator coil is wound around the stator core St. The stator coil includes coil end portions 60 that project from end portions of the stator core St in the axial direction X. The rotor shaft 10 includes coil end cooling oil passages 61 configured to supply cooling oil to the coil end portions 60. The coil end cooling oil passages 61 are formed to penetrate the rotor shaft 10 in the radial direction. The axial oil passage 50 and the coil end cooling oil passage 61 communicate with each other via a space between the inner peripheral surface 14 of the rotor shaft 10 and the outer peripheral surface 21 of the power transfer shaft 20.

With the configuration, cooling oil that has flowed through the axial oil passage 50 can be led to the coil end cooling oil passages 61 via the space between the inner peripheral surface 14 of the rotor shaft 10 and the outer peripheral surface 21 of the power transfer shaft 20. The cooling oil can then be led to the radially outer side of the rotor shaft 10 via the coil end cooling oil passages 61. After that, the cooling oil can be supplied to the coil end portions 60, which are positioned on the radially outer side, by a centrifugal force due to rotation of the rotor shaft 10 to cool the coil end portions 60.

In the embodiment, the rotary electric machine MG includes a first coil end portion 62 that projects on the first axial direction X1 side from an end portion of the stator core St on the first axial direction X1 side, and a second coil end portion 63 that projects on the second axial direction X2 side from an end portion of the stator core St on the second axial direction X2 side. The rotor shaft 10 includes a first coil end cooling oil passage 64 configured to supply cooling oil to the first coil end portion 62, and a second coil end cooling oil passage 65 configured to supply cooling oil to the second coil end portion 63.

The first coil end cooling oil passage 64 penetrates the rotor shaft 10 in the radial direction at a position on the first axial direction X1 side with respect to the outer engagement portions 12 and that overlaps the first coil end portion 62 as seen in the radial direction. In the example, the first coil end cooling oil passage 64 communicates with a radial groove 66 formed in a surface of the first end plate 42 on the first axial direction X1 side to extend in the radial direction, so that cooling oil is supplied to the first coil end portion 62 through the radial groove 66.

The second coil end cooling oil passage 65 penetrates the rotor shaft 10 in the radial direction at a position on the second axial direction X2 side with respect to the outer engagement portions 12 and that overlaps the second coil end portion 63 as seen in the radial direction. In the example, the second coil end cooling oil passage 65 communicates with a notched portion 67 formed by cutting away a part of the second flange portion 16 in the circumferential direction, so that cooling oil is supplied to the second coil end portion 63 through the notched portion 67.

[Other Embodiments]

Lastly, other embodiments of the present disclosure will be described. The configuration of each embodiment described below is not limited to its independent application, and may be applied in combination with the configuration of other embodiments unless any contradiction occurs.

Figure 4:
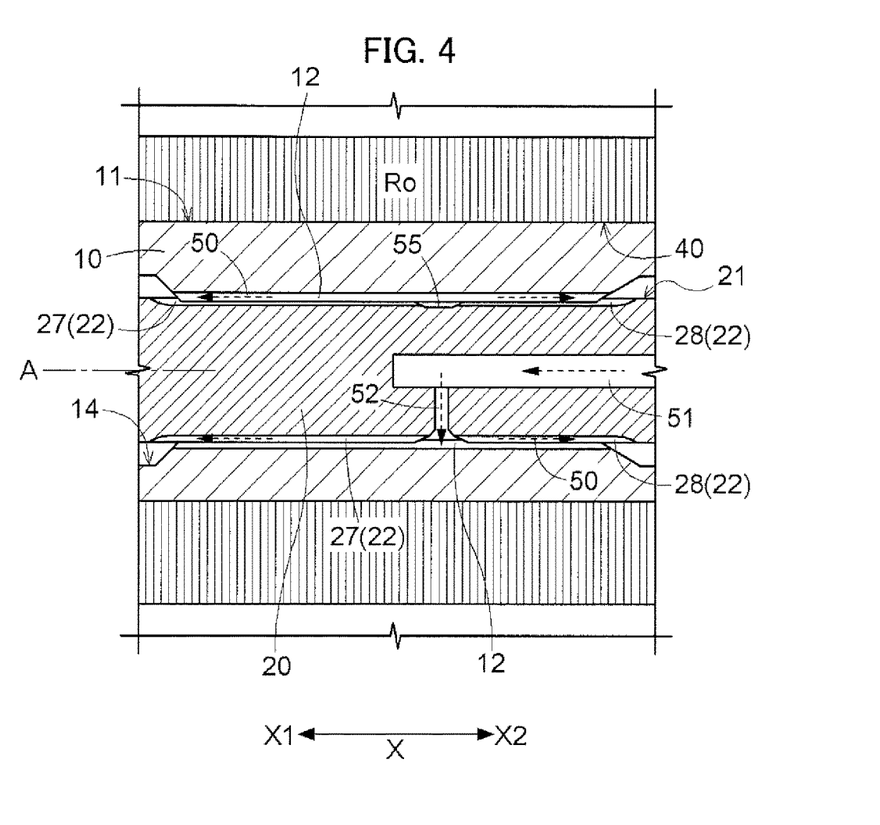
FIG. 4 is an axial sectional view of an essential portion of a drive device according to another embodiment of the present disclosure.

(1) In the embodiment described above, the power transfer shaft 20 is composed of the first power transfer shaft 25 and the second power transfer shaft 26 which are separate members separated from each other in the axial direction X. However, embodiments of the present disclosure are not limited thereto. That is, the power transfer shaft 20 may be an integrally formed shaft that is not divided in the axial direction X as illustrated in FIG. 4. Also in this case, as illustrated in FIG. 4, the inner engagement portions 22 may be formed separately on both sides of the circumferential oil passage 55 in the axial direction X, the inner engagement portions 22 may not be formed, but the cylindrical surface portion 24 which has a cylindrical surface may be formed, on a region of the outer peripheral surface 21 of the power transfer shaft 20 that overlaps the circumferential oil passage 55 as seen in the radial direction, and the outer engagement portions 12 may be formed also on a region of the inner peripheral surface 14 of the rotor shaft 10 that overlaps the circumferential oil passage 55 as seen in the radial direction.

(2) In the embodiment described above, the inner engagement portions 22 are formed separately on both sides of the circumferential oil passage 55 in the axial direction X. However, embodiments of the present disclosure are not limited thereto. That is, the inner engagement portions 22 may be formed on only one side with respect to the circumferential oil passage in the axial direction X. In this case, preferably, the flow path is blocked on the other side with respect to the circumferential oil passage 55 in the axial direction X, on which the inner engagement portions 22 are not formed. Also in this case, cooling oil can be supplied from the circumferential oil passage 55 to the clearances between the outer engagement portions 12 and the inner engagement portions 22.

(3) In the embodiment described above, the outer engagement portions 12 are formed also on a region of the inner peripheral surface 14 of the rotor shaft 10 that overlaps the circumferential oil passage 55 as seen in the radial direction. However, embodiments of the present disclosure are not limited thereto. That is, the outer engagement portions 12 may not be formed on a region of the inner peripheral surface 14 of the rotor shaft 10 that overlaps the circumferential oil passage 55 as seen in the radial direction.

(4) In the embodiment described above, the inner engagement portions 22 are not formed, but the cylindrical surface portion 24 which has a cylindrical surface is formed, on a region of the outer peripheral surface 21 of the power transfer shaft 20 that overlaps the circumferential oil passage 55 as seen in the radial direction. However, embodiments of the present disclosure are not limited thereto. That is, the inner engagement portions 22 may be formed also on a region of the outer peripheral surface 21 of the power transfer shaft 20 that overlaps the circumferential oil passage 55 as seen in the radial direction.

(5) In the embodiment described above, the rotor shaft 10 includes the coil end cooling oil passages 61. However, embodiments of the present disclosure are not limited thereto. That is, the rotor shaft 10 may not include one of the first coil end cooling oil passage 64 and the second coil end cooling oil passage 65, or may include none of the first coil end cooling oil passage 64 and the second coil end cooling oil passage 65.

(6) In the embodiment described above, the distal end portions 29 of the projecting portions of the inner engagement portions 22 are formed in a linear shape in section, and the bottom portions 13 of the recessed portions of the outer engagement portions 12 are formed in an arcuate shape in section to project radially outward. However, embodiments of the present disclosure are not limited thereto. That is, the engagement grooves of the inner engagement portions 22 and the outer engagement portions 12 may have any shape as long as clearances that extend in the axial direction X are formed between the outer engagement portions 12 and the inner engagement portions 22.

INDUSTRIAL APPLICABILITY

The present disclosure may be suitably applied to a drive device that includes a cylindrical rotor core of a rotary electric machine, a rotor shaft that supports the rotor core from the radially inner side, and a power transfer shaft coupled such that the power transfer shaft rotates together with the rotor shaft.

The invention claimed is:
1. A drive device comprising:
a cylindrical rotor core of a rotary electric machine,
a rotor shaft that supports the rotor core from a radially inner side, and
a power transfer shaft coupled such that the power transfer shaft rotates together with the rotor shaft, wherein:

the rotor shaft is formed in a tubular shape that has an outer peripheral surface that contacts an inner peripheral surface of the rotor core;

the power transfer shaft is disposed radially inward of the rotor shaft;

outer engagement portions, which include a plurality of engagement grooves that extend in an axial direction in parallel with each other, are formed on at least a part of a region of an inner peripheral surface of the rotor shaft that overlaps the rotor core as seen in a radial direction;

inner engagement portions, which include a plurality of engagement grooves that extend in the axial direction in parallel with each other and which are engageable with the outer engagement portions, are formed on an outer peripheral surface of the power transfer shaft; and the power transfer shaft is provided with a supply oil passage that supplies cooling oil to an axial oil passage, which includes clearances formed between the outer engagement portions and the inner engagement portions to extend in the axial direction.

2. The drive device according to claim 1, wherein:

a circumferential oil passage is formed between the inner peripheral surface of the rotor shaft and the outer peripheral surface of the power transfer shaft, the circumferential oil passage being continuous in an entire region in a circumferential direction and communicating with the axial oil passage; and a downstream opening of the supply oil passage opens toward the circumferential oil passage.

3. The drive device according to claim 2, wherein a cross-sectional area of the axial oil passage as viewed in the axial direction at a boundary between the circumferential oil passage and the axial oil passage is smaller than a cross-sectional area of the circumferential oil passage.

4. The drive device according to claim 3, wherein the inner engagement portions are formed separately on both sides of the circumferential oil passage in the axial direction.

5. The drive device according to claim 4, wherein the inner engagement portions are not formed, but a cylindrical surface portion that has a cylindrical surface is formed, on a region of the outer peripheral surface of the power transfer shaft that overlaps the circumferential oil passage as seen in the radial direction.

6. The drive device according to claim 5, wherein the outer engagement portions are formed also on a region of the inner peripheral surface of the rotor shaft that overlaps the circumferential oil passage as seen in the radial direction.

7. The drive device according to claim 6, wherein:

the rotor shaft further includes a coil end cooling oil passage configured to supply cooling oil to a coil end, which is a portion of a stator coil of the rotary electric machine that projects from an axial end of a stator core;

the coil end cooling oil passage is formed to penetrate the rotor shaft in the radial direction; and the axial oil passage and the coil end cooling oil passage communicate with each other via a space between the inner peripheral surface of the rotor shaft and the outer peripheral surface of the power transfer shaft.

8. The drive device according to claim 7, wherein:

the power transfer shaft includes a first power transfer shaft and a second power transfer shaft that are separate members separated from each other in the axial direction;

first inner engagement portions that form a part of the inner engagement portions are formed on an outer peripheral surface of the first power transfer shaft;

second inner engagement portions that form another part of the inner engagement portions are formed on an outer peripheral surface of the second power transfer shaft; and the circumferential oil passage is formed between the first inner engagement portions and the second inner engagement portions in the axial direction.

9. The drive device according to claim 8, wherein distal ends of projecting portions of the inner engagement portions are formed in a linear shape in section, and bottom portions of recessed portions of the outer engagement portions are formed in an arcuate shape in section to project radially outward.

10. The drive device according to claim 2, wherein the inner engagement portions are formed separately on both sides of the circumferential oil passage in the axial direction.

11. The drive device according to claim 10, wherein the outer engagement portions are formed also on a region of the inner peripheral surface of the rotor shaft that overlaps the circumferential oil passage as seen in the radial direction.

12. The drive device according to claim 10, wherein:

the rotor shaft further includes a coil end cooling oil passage configured to supply cooling oil to a coil end, which is a portion of a stator coil of the rotary electric machine that projects from an axial end of a stator core;

the coil end cooling oil passage is formed to penetrate the rotor shaft in the radial direction; and the axial oil passage and the coil end cooling oil passage communicate with each other via a space between the inner peripheral surface of the rotor shaft and the outer peripheral surface of the power transfer shaft.

13. The drive device according to claim 2, wherein the inner engagement portions are not formed, but a cylindrical surface portion that has a cylindrical surface is formed, on a region of the outer peripheral surface of the power transfer shaft that overlaps the circumferential oil passage as seen in the radial direction.

14. The drive device according to claim 2, wherein the outer engagement portions are formed also on a region of the inner peripheral surface of the rotor shaft that overlaps the circumferential oil passage as seen in the radial direction.

15. The drive device according to claim 2, wherein:

the rotor shaft further includes a coil end cooling oil passage configured to supply cooling oil to a coil end, which is a portion of a stator coil of the rotary electric machine that projects from an axial end of a stator core;

the coil end cooling oil passage is formed to penetrate the rotor shaft in the radial direction; and the axial oil passage and the coil end cooling oil passage communicate with each other via a space between the inner peripheral surface of the rotor shaft and the outer peripheral surface of the power transfer shaft.

16. The drive device according to claim 2, wherein:

the power transfer shaft includes a first power transfer shaft and a second power transfer shaft that are separate members separated from each other in the axial direction;

first inner engagement portions that form a part of the inner engagement portions are formed on an outer peripheral surface of the first power transfer shaft;

second inner engagement portions that form another part of the inner engagement portions are formed on an outer peripheral surface of the second power transfer shaft; and the circumferential oil passage is formed between the first inner engagement portions and the second inner engagement portions in the axial direction.

\* \* \* \* \*